Dec. 17, 1940.  P. B. HUNTER  2,225,046
RADIO CONTOURMETER
Filed May 3, 1938
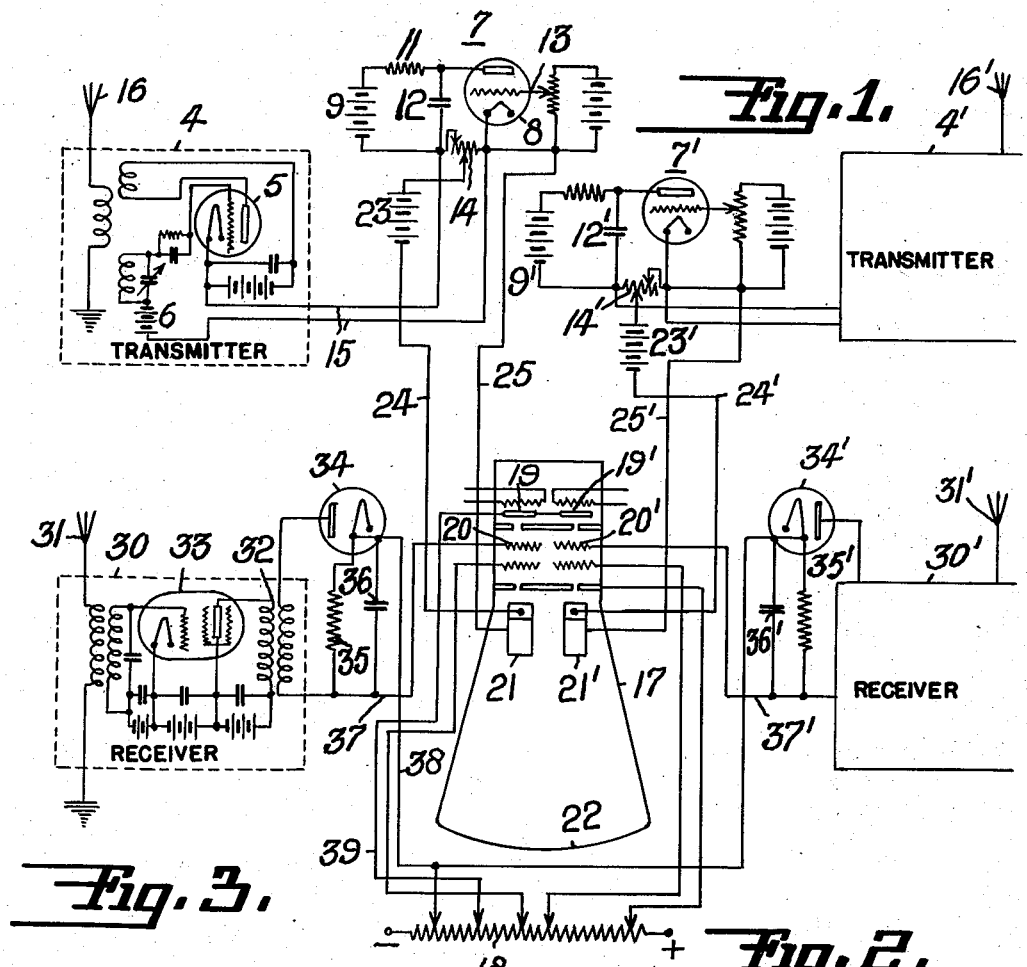
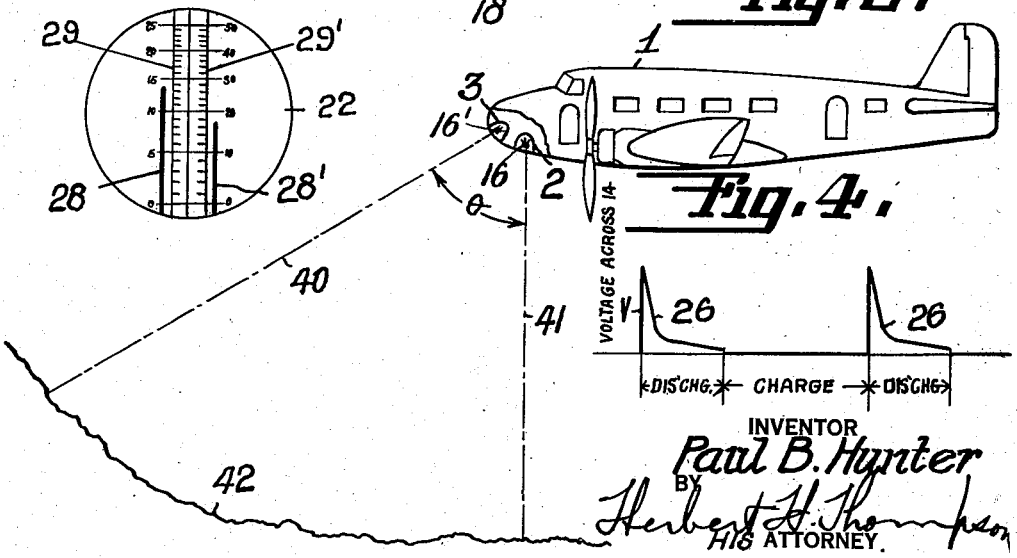
INVENTOR
Paul B. Hunter
BY
Herbert H. Thompson
HIS ATTORNEY.

Patented Dec. 17, 1940

2,225,046

UNITED STATES PATENT OFFICE 2,225,046

RADIO CONTOURMETER

Paul B. Hunter, Bloomfield, N. J., assignor to Sperry Gyroscope Company, Inc., Brooklyn, N. Y., a corporation of New York Application May 3, 1938, Serial No. 205,686

7 Claims. (Cl. 250—1)

This invention relates, generally, to radio means for measuring distance, and the invention has reference, more particularly, to a novel radio contourmeter adapted for indicating the height of an aircraft directly above the terrain over which the same is flying and also the relative height of the aircraft with respect to the terrain in advance of the aircraft, whereby the pilot is given advance information as to whether the terrain he is approaching is ascending or descending, and may therefore control the elevation of his craft accordingly to avoid collision.

While an absolute altimeter such as disclosed in applicant's copending application Serial No. 151,778, filed July 3, 1937, joint with Joseph Lyman and Francis L. Moseley, will give an accurate indication of the height of the craft above the ground, it does not give any indication of the nature of the terrain ahead of the craft and toward which the latter is heading, with the result that especially in hilly or mountainous regions during periods of poor visibility crashes are apt to occur due, for example, to the flying of a craft from a valley toward a mountain, the sudden change in contour of the terrain being too great for the craft to navigate safely without advance information being given the pilot.

The principal object of the present invention is to provide a novel instrument, termed a contourmeter, which will give the pilot of a craft advance information as to the nature of the terrain ahead so that he can maneuver his craft accordingly, whereby, for example, should there arise a mountain ahead too high to climb over, he will have an opportunity to turn to one side or the other and hence avoid a crash.

Another object of the present invention lies in the provision of a novel radio contourmeter that serves to give a continuous visual, accurate indication on an instrument face of the height of the craft directly above the earth and also the relative height of the craft with respect to the terrain in advance of the craft regardless of atmospheric conditions or visibility, the said contourmeter being of rugged, simple and compact nature especially adapting the same for use on aircraft.

Another object of the present invention lies in the provision of a novel contourmeter of the above character that employs intermittently operated ultra high frequency radio transmitter means for transmitting electromagnetic waves that are directed from the craft toward the earth at various angles, said waves, upon reflection, being received by suitable radio receiver means, means being provided and operable at the instants of propagation of said waves to cause a cathode ray tube to operate by movement of beams over the face thereof to time the intervals elapsing between the time of transmission and the time of reception of the reflected waves, the extent of movement of the cathode ray beams over the tube face during such intervals being a measure of the desired distances, the tube face being calibrated to directly indicate such distances.

Other objects and advantages will become apparent from the specification, taken in connection with the accompanying drawing wherein the invention is embodied in concrete form.

In the drawing,

Fig. 1 is a wiring diagram illustrating the novel contourmeter of the present invention.

Fig. 2 is a schematic view in elevation, illustrating an aircraft equipped with the novel contourmeter.

Fig. 3 is a face view of the cathode ray tube of Fig. 1.

Fig. 4 is a graph illustrating an operating characteristic of the invention.

Similar characters of reference are used in all of the above figures to indicate corresponding parts.

Referring now to the drawing, the reference numeral 1 designates an aircraft shown provided with directional transmitter and receiver antennae, one pair comprising transmitter and receiver antennae directed straight downwardly and another pair comprising transmitter and receiver antennae directed forwardly and downwardly at any desired angle with the vertical such, for example, as 60°, the downwardly directed antenna reflectors being designated 2 and the forwardly and downwardly directed antenna reflectors being designated 3 in Fig. 2 of the drawing.

Referring particularly to Fig. 1, a transmitter 4 of the ultra high frequency type has an oscillator tube 5 that is normally biased off by a battery 6, and this tube is put on momentarily at regular intervals, such as twenty-five times per second, due to the action of the relaxation generator 7. This generator comprises a grid controlled tube 8 whose plate is supplied from a battery 9 through a resistance 11. A condenser 12 is connected at one side to the plate supply of tube 8 at a point between the plate electrode of the tube and the resistor 11 and is connected at its other side to the tube cathode. The minimum plate voltage at which tube 8 will discharge may be varied by varying the grid bias as determined by the adjustment of a grid potentiometer arm 13 and, if desired, by supplying sufficient grid bias, the tube may be prevented from passing current.

Assuming that the grid has control, the condenser 12 will be charged by current supplied from battery 9 through resistor 11. While condenser 12 is charging, the plate voltage applied to tube 8 is steadily raised until it reaches a critical value, whereupon the grid loses control and condenser 12 is suddenly discharged through tube 8 and a resistor 14 included between the tube cathode and condenser 12. Due to the approximate short circuit effect of the tube discharge on the condenser 12, the potential of this condenser, and hence that of the tube plate, drops below that necessary to sustain the discharge and before the condenser can recharge due to the presence of resistor 11, with the result that tube 8 shuts off and its grid again gains control preparatory to the repetition of the cycle, which is repeated preferably twenty-five to thirty times a second.

When the tube 8 discharges the condenser 12, a relatively substantial voltage is suddenly supplied across the resistor 14, as shown by the vertical line V in Fig. 4. The ends of this resistor are connected in the cathode grid circuit of the oscillator tube 5 by leads 15, and hence this voltage is applied to the grid of the tube and, overcoming the bias of battery 6, causes this tube to function momentarily to thereby cause the transmitter 4 to send off U. H. F. electromagnetic waves from its directional transmitter antenna 16, positioned, for example, in the downwardly directed reflector 2, whereby these waves are directed toward the ground. Since the bias of battery 6 is such as to shut off transmitter 4 except when the voltage V is at its peak value shown in Fig. 4, and as this voltage V decays rapidly at first, only one or perhaps a few ultra high frequency electromagnetic waves of effective amplitude will be transmitted by equipment 4 at each moment of transmission, so that there will be no standing waves in space when using this equipment, but instead at intervals of one-twenty-fifth of a second, for example, a short electromagnetic wave or waves will be sent off which will travel to the ground and will be partially reflected to the receiver antenna 31, thereby exciting the receiver momentarily, the apparatus of this invention serving to time the interval required for the wave or waves to travel to the earth and back to the apparatus.

Similarly, a transmitter 4', operating at a somewhat different frequency from transmitter 4, is controlled by a relaxation generator 7' so as to send off U. H. F. electromagnetic waves from its directional transmitter antenna 16' which may be located, for example, within the parabolic reflector 3 directed forwardly and downwardly at the angle θ, such as 60°, with respect to the vertically directed waves emitted by antenna 16.

A cathode ray tube 17 has its elements supplied from a potentiometer 18 connected across a D. C. supply. This tube is shown as provided with two transversely separated electron emitting areas or cathodes 19, 19', which are electrically connected together. This tube is shown as provided with two independent control grids 20 and 20' for independently controlling the electron streams emitted from the cathodes 19 and 19', respectively. This tube is shown provided with two sets of vertical deflecting plates 21 and 21' for respectively deflecting the electron beams emitted from cathodes 19 and 19'.

The beams projected from these cathodes are normally biased above the visible part of the face 22 of the tube by batteries 23 and 23'. Battery 23' is connected through leads 24' and 25' and a portion of resistor 14' to the vertical deflecting plates 21' of tube 17. As soon as the discharge voltage appears across the resistor 10 14 or the resistor 14', the polarity of the deflecting plates 21 or 21', as the case may be, is reversed and the beam is moved instantly to the bottom of the face 22, and thereupon starts to rise at a rate depending upon the rate of decay of the voltage across the corresponding resistor 14 or 14', and this may be varied by varying the magnitude of this resistor.

The curves 26 of Fig. 4 show typical rates of decay of voltage V during the period of discharge of condenser 12 or 12'. Thus, as the voltage V decays, the cathode ray beam is caused to move upwardly due to the action of the battery 23 or 23', as the case may be, thereby producing luminous paths 28 and 28' on the face of tube 17 adjacent the distance scales 29, 29'. The beams move upwardly rapidly at first and with gradually decreasing rapidity, so that scales 29, 29' are provided with their length or distance indications arranged substantially logarithmically and with the greater spacing of indications at the bottom of the scale so as to permit a more accurate determination of altitude and contour at points near the earth.

The radio receiver 30 is tuned to the same frequency as the transmitter 4 and the antenna 31 of this receiver is positioned alongside of the antenna 16, though it is shielded therefrom, these antennae being preferably mounted within two of the downwardly directed reflectors 2 arranged alongside one another with shielding means therebetween. As soon as the receiver 30 receives the reflected wave sent out by the transmitter 4, a voltage pulse is impressed on the secondary of output transformer 32 from detector tube 33, causing the diode tube 34 to operate and create a voltage drop across a resistor 35 in its plate cathode circuit, thereby charging a condenser 36 connected in parallel with resistor 35 and depressing the voltage on the control grid 20 of the cathode ray tube 17, inasmuch as one side of the condenser 36 is connected to the grid 20 by a lead 37 and the other side of this grid, connected to the cathode, is also connected by a lead 38 to a point on potentiometer 18 that is of lower potential than the voltage supply through a lead 39 to the tube cathode 19. Hence, the cathode ray beam passing between plates 21 is cut off and the length of the fluorescent line 28 indicates on scale 29 the height of the craft above the ground. By the time that condenser 36 has discharged and the cathode ray beam is again turned on, the same will be directed to its initial or normal position above the scale 29 preparatory to another operation of the relaxation generator 7. Since the path or line 28 is produced twenty-five or more times per second, persistence of vision on the part of the observer will cause this path or line to appear continuous. Since the cathode ray tube is initiated in its operation as soon as the transmitter starts to function and has its beam shut off upon the return of the first reflected wave, the time interval measured by the tube is an accurate indication of the height of the craft.

Similarly, as soon as the receiver 30' receives the reflected wave sent out by transmitter 4', the diode 34' is caused to operate and create a voltage drop across the resistor 35', charging the condenser 36' and depressing the voltage on control grid 20' so that the cathode ray beam passing between plates 21' is cut off, the length of the fluorescent line 28' indicating on scale 29' the distance of the craft from the earth as measured along the line 40 in Fig. 2. Inasmuch as the contour of the earth is never exactly smooth but is more or less irregular, such irregularity, even though slight, will provide surface portions that are perpendicular to the ultra high frequency beam having the axis 40 so that these surface portions reflect the necessary radiation back along axis 40 for exciting the receiver 30'. It is merely necessary that the transmitter 4' transmit sufficient energy and the receiver 30' have sufficient gain to give the desired control signal for shutting off the corresponding beam of tube 17. Thus, by making the angle $\theta$ equal 60°, the distance 40 would be twice the length of the distance 41 in Fig. 2 in the event that the earth's contour 42 is horizontal and the craft is flying on an even keel. By adjusting resistor 14' so as to make scale 29' one-half that of scale 29, the two luminous paths 28 and 28' will have the same length as long as the ship is flying above flat country. In other words, these lines 28 and 28' will have their tops level with each other. However, as soon as the contour of the earth in advance of the craft changes, this will no longer be true, the depressing of line 28' below line 28 indicating that the contour of the earth is rising, as shown in Figs. 2 and 3. Likewise, should line 28' become longer than line 28, it will serve to indicate that the contour of the earth is falling. Thus, the pilot, in using the device of the present invention, can tell at all times the condition of the earth's contour ahead of him and can accordingly control his craft so as to either fly over obstacles or avoid the same by turning to one side or the other, and hence preventing crashes.

By varying the magnitude of the resistors 14 or 14', the rate of upward movement of the cathode ray beams may be varied, thereby varying the scales 29 and 29' so that successive indications thereof may be caused to indicate, for example, 10, 100 or 1000 foot intervals, whichever is desired.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

What is claimed is:

1. A radio contourmeter for aircraft, comprising transmitting means, relaxation generator means for causing said transmitting means to intermittently directionally emit ultra high frequency electromagnetic radiation downwardly and also in advance of the aircraft, an indicator initiated in its operation by said relaxation generator means upon each emission of said radiation, receiving means carried by the craft for receiving said radiation after reflection from the earth, means including a control circuit fed from said receiving means and connected to said indicator for terminating the operation of the latter, the operation of said indicator serving as an indication of the height of the craft above the earth and further indicating the relative elevation of the terrain in advance of the craft.

2. In an instrument of the character described for aircraft, radio transmitting means including directive antennae disposed to direct ultra high frequency pure carrier radiation in selected directions only from said craft, radio receiving means having directive receiving antennae disposed to respectively receive reflected radiation returning from said directions, means for causing said transmitting means to operate momentarily at regular intervals of time to cause said directional antennae to deliver pure carrier radiation in the form of beams extending in said selected directions from the aircraft, a cathode ray tube, said last named means also serving to vary potentials on the deflecting plates of said cathode ray tube for use in timing the periods required for the electromagnetic radiation from said transmitting means directive antennae to reach the earth and return by reflection to said receiving means, said receiving means being connected to said cathode ray tube and operating to determine the end of each of said timing operations, whereby said cathode ray tube indicates the changing contour of the earth below and in advance of the craft and the distances of the craft therefrom.

3. In a radio contourmeter for aircraft, a pair of ultra high frequency transmitters having directional antennae, one of said antennae being directed downwardly for transmitting beam type electromagnetic energy directly down for reflection from a limited portion of the terrain below, and the other downwardly and forwardly for transmitting beam type electromagnetic energy downwardly and forwardly for reflection from a limited portion of the terrain in advance of the aircraft, thermionic tube means for causing said transmitters to operate intermittently and momentarily, a cathode ray tube having a pair of cathode ray beams, said thermionic tube means being connected to said cathode ray tube for causing the beams of said tube to move over the face thereof upon the respective operations of said transmitters, and receivers having directive receiving antennae for receiving reflected radiation initially transmitted from said transmitters and reflected from said separated portions of the terrain, said receivers being connected to the control grids of said cathode ray tube for shutting off said beams, the visible paths traversed by said beams being measures of the height of the craft with respect to the terrain below and in advance of the craft.

4. In a radio contourmeter for aircraft, ultra high frequency transmitters having highly directive antennae, relaxation generators for causing said transmitters to operate intermittently and but momentarily so that said antennae send out beams of electromagnetic energy in selected directions from the craft, a cathode ray tube adapted to produce as many beams moving in parallel planes as there are transmitters, said relaxation generators being connected to said cathode ray tube and serving respectively to cause the respective beams of the tube to move over the face thereof upon operations of the respective transmitters, and radio receivers having highly directive antennae for receiving reflected radiation initially transmitted from said transmitters and returning from spaced points of the terrain below, said receivers being connected to said cathode ray tube for shutting off said beams, the paths produced by said beams on the face of said tube being measures of the height of the craft with respect to the earth below and in advance of the craft.

5. A radio contourmeter as defined in claim 4, wherein said relaxation generators are provided with means for varying the rate of movement of the two beams to accordingly vary the reading scales of the tube.

6. A change of contour indicating device for aircraft comprising a plurality of transmitting means including directional antennae disposed for directionally emitting high frequency radio waves toward the ground at different angles with respect to the longitudinal axis of the craft, one of which antennae directs the waves ahead of the craft, a plurality of receiving means for directionally receiving the reflected waves from the ground, and indicating means cooperating with said transmitting and receiving means for indicating the comparative distance of the craft from the points of reflection of said waves on the ground.

7. A radio contourmeter as defined in claim 4, wherein said cathode ray tube is controlled so that the tops of said beam paths are on a level with one another as long as the terrain in advance of the craft is level with that over which the craft is flying.

PAUL B. HUNTER.